(12) United States Patent
Doering et al.

(10) Patent No.: US 8,397,234 B2
(45) Date of Patent: *Mar. 12, 2013

(54) DETERMINING A PRIORITY VALUE FOR A THREAD FOR EXECUTION ON A MULTITHREADING PROCESSOR SYSTEM

(75) Inventors: Andreas Doering, Adliswil (CH); Maria Gabrani, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 979 days.

This patent is subject to a terminal disclaimer.

(21) Appl. No.: 12/334,678

(22) Filed: Dec. 15, 2008

(65) Prior Publication Data

US 2009/0183158 A1    Jul. 16, 2009

Related U.S. Application Data

(63) Continuation of application No. 10/737,464, filed on Dec. 16, 2003, now Pat. No. 7,478,391.

(30) Foreign Application Priority Data

Dec. 20, 2002   (EP) .................................. 02028545

(51) Int. Cl.
    *G06F 9/46*   (2006.01)
(52) U.S. Cl. ...................................................... 718/100
(58) Field of Classification Search .................... 718/100
    See application file for complete search history.

(56) References Cited

U.S. PATENT DOCUMENTS 5,752,031 A *  5/1998  Cutler et al. .................. 718/103
6,651,125 B2 * 11/2003  Maergner et al. .............. 710/244

OTHER PUBLICATIONS

Luo, Kun et al. "Boosting SMT Performance by Speculation Control."
Dorai, Gautham et al. "Optimizing SMT Processors for High Single-Thread Performance," Journal of Instruction-Level Parallelism 5, published Apr. 2003, 1-35.
Tullsen, Dean et al. "Exploiting Choice: Instruction Fetch and Issue on an Implementable Simultaneous Multithreading Processor," Proceedings of the 23rd Annual International Symposium Computer Architecture, Philadelphia, PA May 1996.

* cited by examiner

*Primary Examiner* — Mengyao Zhe
(74) *Attorney, Agent, or Firm* — Michael J. Buchenhorner; Vazken Alexanian

(57) ABSTRACT

An apparatus for determining a priority value for a thread for execution on a multithreading processor system includes: a base value register for depositing a priority base value; and an evaluation unit for determining the priority value of the thread for execution on the multithreading processor system subject to the priority base value and an application priority value delivered from a thread's application.

14 Claims, 2 Drawing Sheets

DETERMINING A PRIORITY VALUE FOR A THREAD FOR EXECUTION ON A MULTITHREADING PROCESSOR SYSTEM

CROSS-REFERENCE TO RELATED APPLICATIONS

This application is a continuation of, and claims priority from, commonly-owned U.S. application Ser. No. 10/737,464, filed on Dec. 16, 2008, now U.S. Pat. No. 7,478,391.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention relates to a method and an apparatus for determining a priority value for a thread for execution on a multithreading processor system.

BACKGROUND OF THE INVENTION

Volume In a processor or processor core with hardware multithreading support (MTP=Multithreading Processor), several threads can be executed concurrently. In the following, the term thread is used as synonym for what is also called a routine, a set of instructions, a task or a process according to technical language. Due to cache misses, coprocessor use or synchronization mechanisms some of the threads may have to wait for a limited amount of time. In this time instructions from these threads cannot be executed. Typically the remaining threads compete for the processing resources/execution pipelines such as arithmetic-logic-units or memory interfaces. Threads can be executed in parallel in different execution pipes and competition is for one or more of these execution pipes. This competition has to be resolved by selecting one or more threads whose instructions will be executed next.

If no control of the way instructions are issued exists in such processors, a single thread can be executed slower than it would be executed on a single thread processor system. Recently, MTP have been used for systems with real-time constraints as well, e.g. network and media processors. In these fields the execution time requirements of threads may vary depending on several issues. Therefore it is important to guarantee thread execution differentiation. To that end, a mechanism that controls the way instructions are issued from threads is of high value.

The current methodologies investigated and discussed in the literature mainly concentrate on improving the overall throughput of a multithreaded processor.

U.S. Pat. No. 6,105,127 discloses a multithreaded processor for executing multithreaded instructions stream. A control unit is provided for deciding which instruction should be issued to a functional unit designated by two or more instruction issues requests at the same time, in accordance with priority levels held by a holding unit.

U.S. Pat. No. 6,212,544 B1 discloses a method for controlling the switching between at least two threads. Priorities are incorporated by a thread state register comprising a thread priority field for one of three priority values—low, medium, high.

U.S. Pat. No. 6,477,562 B2 introduces instruction scheduling for multi-streaming processors. A priority controller generates priorities for instruction selection and access rights to certain resources.

In many systems, tasks of varying importance are assigned to the threads of a processor. In such a situation, the instruction selection process has to be controlled to guarantee that the most important tasks are executed first and thus, fast. At the same time, the effort of the control of instruction selection should be very low, because it impacts—and in particular reduces—the total amount of processing capacities for applications.

Thus, it is desired to provide a method and an apparatus for determining a priority value for a thread for execution on a multithreading processor system, that defines the priority value of a thread in a way that takes the true need of execution at the time into account.

SUMMARY OF THE INVENTION

Briefly, according to an embodiment of the invention an apparatus for determining a priority value for a thread for execution on a multithreading processor system includes: a base value register for depositing a priority base value; and an evaluation unit for determining the priority value of the thread for execution on the multithreading processor system subject to the priority base value and an application priority value delivered from a thread's application.

According to another aspect of the invention, there is provided a computer program element comprising computer program code which, when loaded in a processor unit of an apparatus, configures the processor unit for performing a method for determining a priority value.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
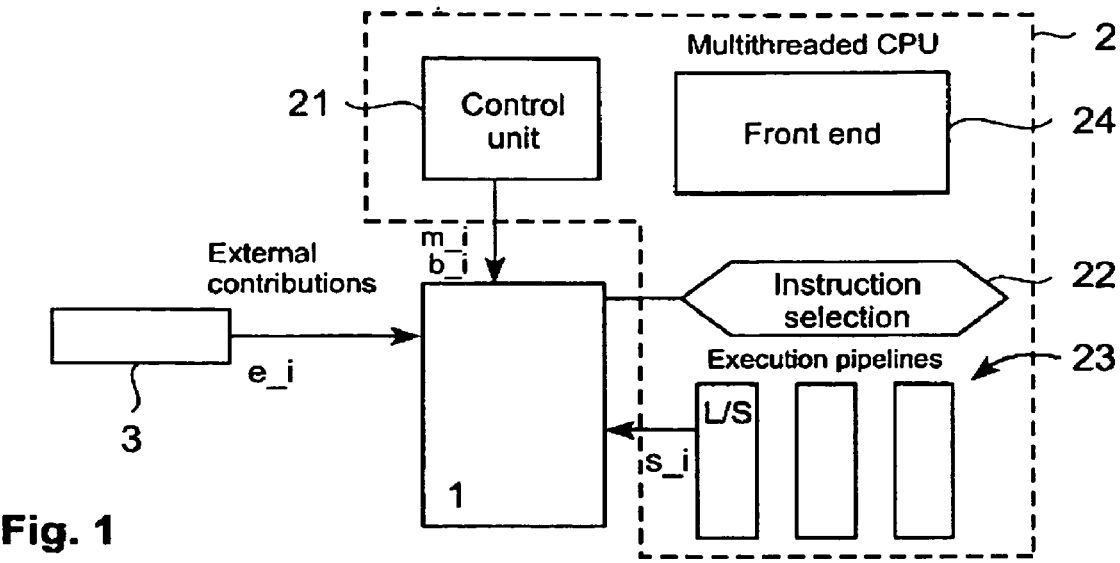
FIG. 1 shows a block diagram of an apparatus according to an embodiment of the present invention and an associated multithreading processor system.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe an apparatus and system for determining a priority value for a thread for execution on a multithreading processor system. The apparatus, according to an embodiment of the present invention, enables a method that includes steps of: receiving a priority base rating, receiving an application priority rating from a thread's application, and determining the priority value subject to the base rating and the application priority rating.

The thread to be assessed can be a thread that is in a queue of threads waiting to be executed on the multithreading processor system, or be a thread that already started to be executed but may be reassessed, and may finally be re-ranked according to changes in priority values of other waiting threads or even running threads, and thus be reset into the queue of waiting threads or be continued in execution.

A justified priority level for a thread is subject to a priority assessment of the thread from the thread's application itself, which has unique knowledge of the individual requirements of a single thread. Such application priority rating can be delivered from the thread's associated application or might be sort of attached to the thread itself. An additional source of priority rating information is advantageously the multithreading processor system, which has unique knowledge of the different relative requirements of all threads in the system. Multithreading processor control unit, e.g. its operating system or some other control logic are advantageous sources of the multithreading processor system for delivering the priority base value to the inventive apparatus or as input of the inventive method. However, another processor system might be capable of rating the threads of the multithreading processor system in a relative manner.

The priority value, which in the end allows a ranking of the thread amongst other threads with other priority values associated and determines in particular access time and resources for the thread, is based on the priority base value and the application priority value. This means, that at least these two ratings have impact on the priority value in some way.

The invention shows lots of benefits: The thread prioritization method and apparatus consider input ratings from different sources that influence a thread's priority in a distinct and unique way. These ratings are taken from the input source's point of view. Sources are select such that they take different view based on different information the sources have access to. The input values of these sources are structured in a way that differentiation between threads can be obtained in a relative way, which simplifies the decision and input update process a lot. The priorities used for instruction selection can be modified from the several sources with minimal software or hardware effort.

The application code is independent of its overall priority and the hardware context on which it is executed. This reduces program code size and number of instructions. The proposed invention can be used with a wide number of hardware threads and a wide range of resolution of the contributions to thread priority. The impact of the various sources on each thread's priority can be controlled by a control unit (e.g. operating system) without invocation of the control program at every modification of a source's contribution.

Advantageously, the priority base rating represents a priority rating of the thread with regard to other threads. Base priority values of other threads typically have impact on determining a base priority value of a certain thread. The multithreading processor system assesses the base priority value of a thread in relation to the base priority values of other threads advantageously, application priority rating represents a priority rating of the thread from the thread's application point of view. Application for example might know that the thread to be rated is actually an important part of the overall application or a part that has to be handled very quickly in relation to other parts of the application, that are represented by other threads. In such a case, the application will attribute a high application priority level to this thread.

Priority base rating is typically represented by a priority base value and the application priority rating is typically represented by an application priority value. Such values are typically stored in respective registers when brought to the apparatus' attention.

According to an advantageous embodiment of the present invention, a main value is obtained by adding the priority base value and the application priority value. In one embodiment, this main value can be used as priority value. In another embodiment, this main value is used as interim value the priority value is based on. The main value is reflecting the processor's and the application's priority rating of the thread.

In another advantageous embodiment of the invention, a priority maximum value is introduced, wherein the priority maximum value and the priority base value define a set of initial boundaries for the priority value. The priority maximum value can be delivered from the multithreading processor system, thus defining a maximum value the priority value based on the priority base value and the application priority value typically should not exceed. The priority maximum value might also be calculated by the apparatus subject to the priority base value. Then, only the priority base value has to be transferred from the multithreading processor system. The priority maximum value can vary for different threads. Also, the range that is defined by the priority maximum value and the priority base value and having the priority maximum value and the priority base value as boundaries can have different extension from thread to thread.

Advantageously, a first lower value is determined as lower value of the main value and the maximum value. This is to limit priority values to the given priority maximum value, even when the sum of priority base value and application priority value exceeds the priority maximum value. Introduction of the priority maximum value is used to assure that a thread will not completely limit processing capacity and thus make other waiting threads starve. In an embodiment, the first lower value can also be used as priority value for the thread considered.

In another advantageous embodiment of the invention, an external priority rating of the thread is received, and the priority value is determined subject to the external priority rating. External input might be worth considered. External contributions represent another independent source of priority rating since taking a different view and based on different deliberations than the application or the multithreading processor system. The input is not limited to a specific external request but can be extended to several external contributions.

Advantageously, the external priority rating represents a priority rating of the thread considering external needs, and the external priority rating is represented by an external priority value.

In another advantageous embodiment, an external limit value is defined and a second lower value is determined that is the lower value of the external priority value and the external limit value. In this embodiment, the external limit value is used to assure that a thread and in particular its external priority rating will not completely limit processing capacity for other threads and thus make other waiting threads starve. The external limit value is advantageously set by the apparatus itself, or can be transmitted by the multithreading processor system.

Advantageously, the priority value is obtained as a function of the first lower value and the second lower value. For example, these values might be added or subject o a maximum function. When determining the priority value this way, the priority value is a priori limited to a range of values between the priority base value and the priority maximum value plus the external limit value. The upper boundary is extended with regard to an embodiment where only application and processor system rating were considered. Additional external rating might be worth permitting a higher upper boundary of a range for priority values.

In another advantageous embodiment of the present invention, the priority value is determined anew when at least one of the values involved in the specific calculation of the priority value has changed. This enables the method and the apparatus to be responsive to changes and to adapt to changing priority levels accordingly.

Advantageously, a priority value is determined for each thread, and the threads are ranked according to their respective priority value. Priority values of different threads are still numeric values. In order to translate these values into a ranking, advantageously a sorter is used. Then, the multithreading processing system can process the threads according to the ranking.

According to another aspect of the invention, there is provided an apparatus for determining a priority value for each thread for execution on a multithreading system. This apparatus comprises a base value register for depositing a priority base value delivered from the multithreading processor system, and an evaluation unit for determining the priority value subject to the priority base value and an application priority value delivered from a thread's application.

The evaluation unit can be implemented in hardware or software or a combination thereof, or any other suitable implementation, although an implementation in hardware is advantageous due to limited costs, quick responsiveness and speed, in particular when used in the field of network processing.

Advantages of the inventive apparatus and its embodiments go along with the advantages of the inventive method and its embodiments described above.

According to another aspect of the invention, there is provided a computer program element comprising computer program code which, when loaded in a processor unit of an apparatus, configures the processor unit for performing a method as described above or any one of the method's embodiments.

FIG. 1 shows a block diagram of an apparatus 1 and an associated multithreading processor system 2.

The proposed apparatus 1 communicates with the multithreading processor system 2—that comprises at least a control unit 21 and software—by providing thread ranks r to an instruction selection element 22 of the multithreading processor system 2, and by receiving values from the control unit 21, from an execution pipeline 23 from external sources 3. The external sources 3 provide an external priority value $e\_i$ to the apparatus 1, while the control unit 21 provides a priority base value $b\_i$ and a maximum priority value $m\_i$ to the apparatus 1. An application priority rating $s\_i$ is provided by execution pipelines 23 that communicates the priority rating $s\_i$ of a thread's application to the apparatus 1 by load/store commands LS. The transfer of values $b\_i$ and $m\_i$ from the control unit 21 to the apparatus 1 can be accomplished with registers in the apparatus 1. The multithreading processor system 2 communicates with the apparatus 1 by using existing instructions like "load" and "store" or "access" to dedicated registers. For instance, if the shown multithreading processor system 2 is a PowerPC type processor, special function registers or device control registers can be used which are accessed via dedicated instructions. Otherwise, the communication can be done by mapping the control registers into memory. Note, that the control unit can be an external entity or a software process on the processor.

Apparatus 1 can be incorporated into the multithreading processor system 2 or form an integral part of, or can be part of the processor core or be separately implemented and coupled through interfaces, e.g. the ones discussed above.

The right half of multithreading processor system 2 in FIG. 1 symbolizes processing of a thread. Starting with a front part 24 of execution, instruction selection unit 22 then provides respective information, and execution pipelines 23 perform execution.

In this embodiment, three separate sources are considered that transfer independent priority ratings on a thread to the apparatus, the three priority ratings influence a priority value—also called physical priority—that is allocated to the thread by means of the apparatus. The three sources are:

The application itself, which has unique knowledge of the individual requirements of a single thread.

A processor control unit, for example as part of an operating system, which has unique knowledge of the different relative requirements of all threads in the system.

External input, which has unique knowledge of the status of external requests. The external input can be widened for several external contributions.

Assume that the normal execution of a thread uses a medium application priority value $s\_i$ from the view of the thread. At some situations the thread may know that the following execution is of lower application priority value $s\_i$. An example for this is, when the thread requests an external resource it will need at a later point and has some work to do up to this point. In this situation it may be favorable to run the thread with a lower application priority value $s\_i$, and therefore normally with a lower instruction rate instead of running first with normal application priority value $s\_i$ and waiting later for the requested item. In contrast to this, when the thread has occupied a critical resource, e.g. a semaphore of a frequently used data object, it can increase its priority to a higher application priority value $a\_i$ to reduce the pressure on this resource.

To allow all threads to execute the same code and reduce the overhead of the priority modification, a uniform way of accessing the thread's priority contribution is desirable. This is accomplished via the use of dedicated registers which are accessed via existing instructions, e.g. special function registers (SFR) or device control registers (DCR) in a PowerPC processor. The idea is that all threads use the same register number and the hardware incorporates the identity of the thread which executed the instruction later.

However, a thread usually does not know which other threads run on the same processor. Therefore, there may be threads with tasks of way higher or lower importance. To take this into account, a control unit which controls the threads on the multithreading processors sets a a priority base value $b\_i$ and a maximum priority value $m\_i$ for each thread. The maximum priority values $m\_i$ can be used to assure that a thread will not starve other threads. The priority base values $b\_i$ assist in keeping a balance in the relative thread priorities as assigned by the control unit of the multithreading processor system.

Figure 2:
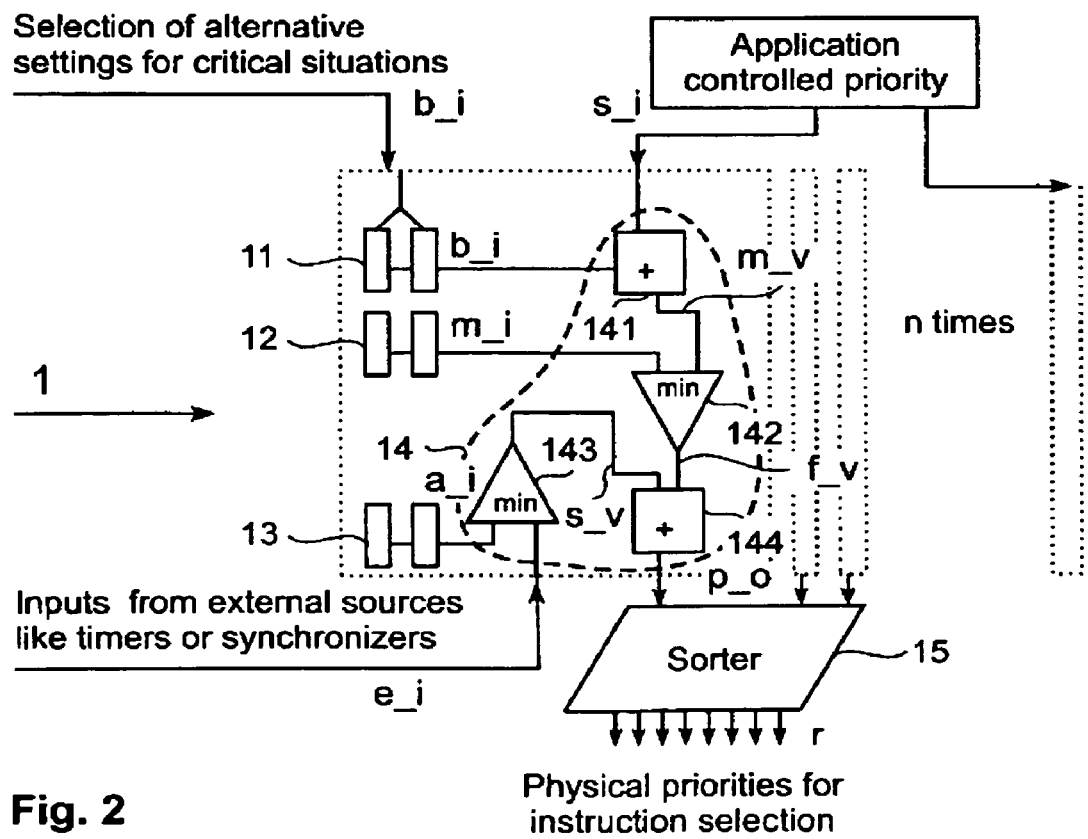
FIG. 2 shows a schematic diagram of an apparatus, in accordance with an embodiment of the present invention.

FIG. 2 shows a schematic diagram of an apparatus 1 that is supplied with such priority base value $b\_i$, such maximum priority value $m\_i$, and such application priority value $s\_i$. Priority base value $b\_i$ is stored in base value register 11, maximum priority value $m\_i$ is stored in maximum value register 12. Application priority value $s\_i$ might also be stored in a register not shown in FIG. 2.

Apparatus 1 further comprises an evaluation unit 14 including an adder 141 and a minimum function 142. Priority base value b_i and application priority value s_i are added to a main value m_v, which can—in some other embodiments—also be taken as priority value for the thread. In contrast it is advantageous here, that the main value is further processed. Output of minimum function 142 delivers a first minimum value f_v that is $f\_v=\min(m\_i, b\_i+s\_i)$.

A third contribution is considered before the physical priority is determined, even hough in some embodiments the first minimum value could be taken as physical priority. This third priority assessment comes from external sources. One example for an external source is a synchronization coprocessor. When it detects that another thread requests a semaphore which is occupied by the considered thread it may boost the priority temporarily over the normal bound m_i. Again, a limiting factor may be introduced. This limiting factor is external limit value a_i which is stored in external limit value register 13.

If the value delivered from the external source is e_i—which may also be stored in an associated register not shown in FIG. 2, the contribution to the overall priority value is determined by a minimum function 143 which provides a second minimum value $s\_v=\min(a\_i, e\_i)$ at its output. Second minimum value s_v is then added by means of adder 144 to first minimum value f_v. Result is priority value p_o. Note that the maximum priority value p_o a thread can reach this way is m_i+a_i. If several external sources are used, their values can be combined by either adding them or by using their maximum.

Note that FIG. 2 shows registers 11 to 13 and evaluation unit 14 only for calculating a priority value for one single thread. With n threads to be evaluated, these elements have to be provided n times, as indicated by dotted lines in FIG. 2.

It may be desirable, to allow in this process a larger range of values from the sources than the value range the physical priorities have. Therefore, a sorting step may be needed to generate the final values for the physical priorities. A sorter 15 may generate a ranking out of priority values p_o. Sorter output is ranking r of priority values. The sorter 15 can work incrementally, i.e. it rearranges its output r every time one of the inputs changes. In this way, the area cost of the sorter 15 is reduced.

As indicated above, the structure including the adders and two "min" circuits is advantageously repeated for every hardware context in the processor. All components above the sorter 15 like adder, min functions and registers can work on bit vectors of a common width w which determines precision. An appropriate value for the precision depends on the intended applications and the number of threads. A range of eight to sixteen is an advantageous number of threads to handle. The sorter 15 retains the relative sizes of the inputs but generates output bit vectors of minimal size. As an example, for eight threads a three-bit vector representing each thread's priority value is sufficient.

Figure 3:
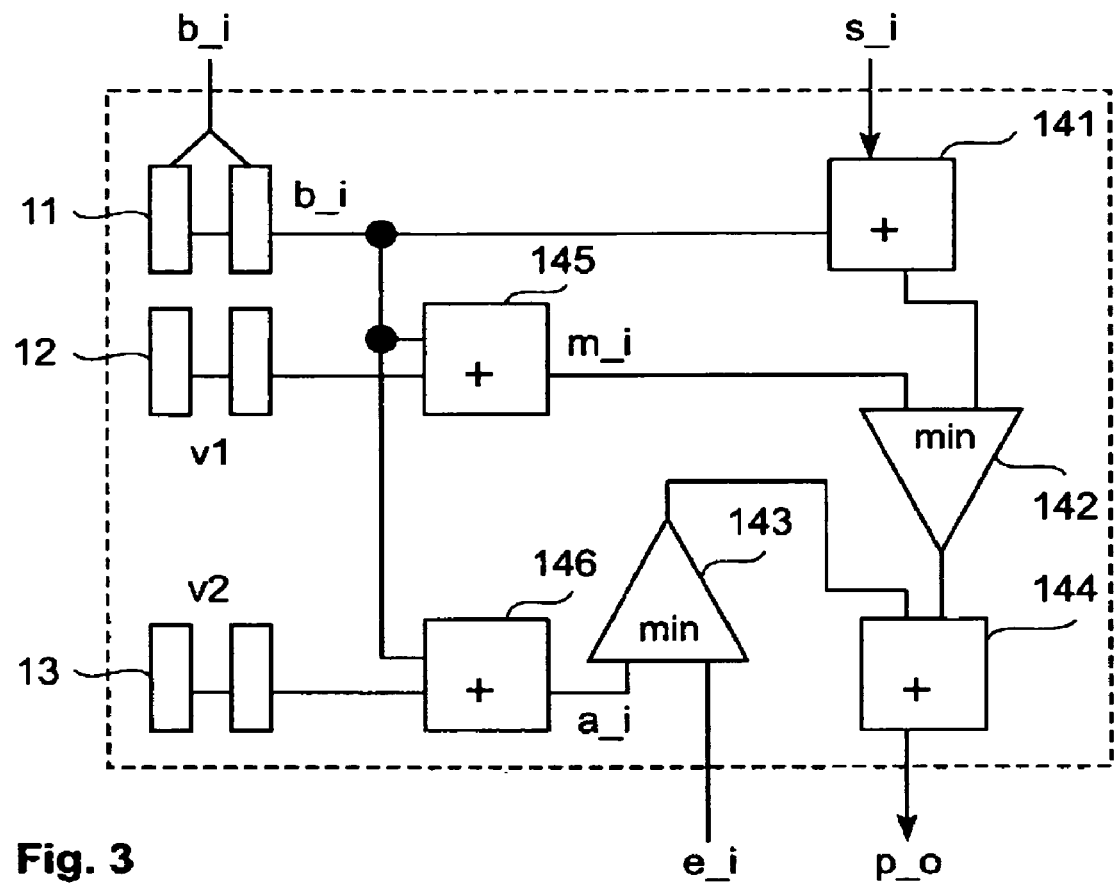
FIG. 3 shows a schematic diagram of another apparatus, in accordance with an embodiment of the present invention.

FIG. 3 shows a schematic diagram of another apparatus, in accordance with an embodiment of the present invention. This embodiment creates the maximum priority values m_i as offsets from the base priority values b_i. That means that the writing of a priority base value b_i into the base value register 11 and writing an offset value v1 into the maximum value register 12 results in a priority maximum value of $m\_i=b\_i+v1$ by means of adder 145. The same applies for a_i: Another offset value v2 is written in the external limit value register 13 and added to the priority base value b_i by means of adder 146, resulting in external limit value a_i. Such a behavior can be obtained by inserting an adder before each of the min blocks.

In FIGS. 2 and 3 all the registers 11, 12, 13 are drawn twice. This illustrates a proposed feature of the apparatus of containing several sets of registers which can be switched very fast. In this way, in emergency situations an appropriate configuration can be established very quickly and the previous configuration used for normal operation is conserved and can be reactivated after the error situation is resolved. Error handling is improved. In a network processor, there is frequently a control point which supervises a lot of other processors. An example scenario is that the control point processor switches between the normal operation and the exceptional operation register set for some or all processors.

Figure 4:
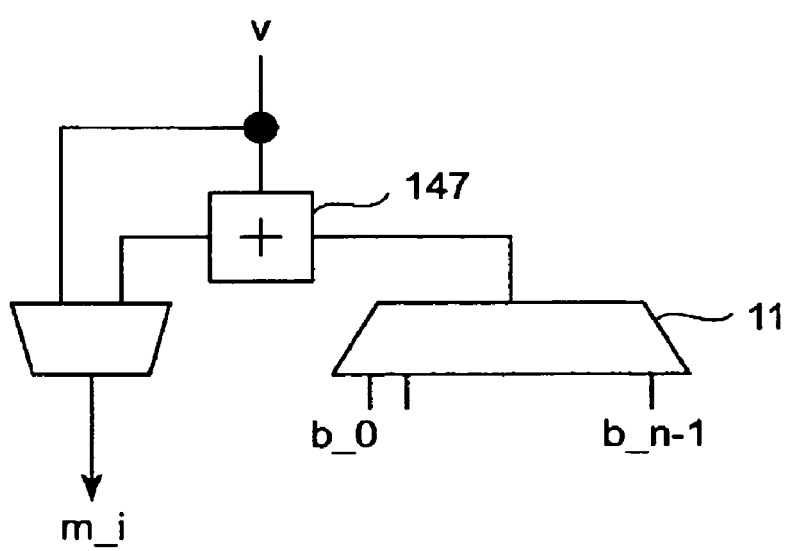
FIG. 4 shows an alternative register structure used in an apparatus, in accordance with an embodiment of the present invention.

However, a cheaper solution is expected if one common conditional adder 147 is used in the write and read paths to the registers. The write path is shown in the following FIG. 4, supplying offset value v.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

We claim:

1. An apparatus for determining a priority value for a thread for execution on a multithreading processor system, said apparatus comprising:

a base value register configured for depositing a priority base rating provided by the thread's application decision making system, wherein said priority base rating represents a priority rating of the thread relative to other threads in said thread's application; and an evaluation unit configured for determining the priority value of the thread for execution on the multithreading processor system, wherein the priority value of the thread is determined as follows:

receiving an application priority rating from the thread's application;

receiving a main value by adding the priority base rating and the application priority rating;

determining a first lower value that is the lower value of the main value and a priority maximum value, the first lower value being made equal to a smallest number between the main and maximum value;

receiving an external priority value that represents a priority rating of the thread considering external needs;

defining an external limit value for the external priority value, wherein the external limit value is used to prevent starvation of other waiting threads;

determining a second lower value that is a lower value of the external priority value and the external limit value; and receiving the priority value for the thread as a function of the first lower value and the second lower value for execution on the multithreading processor system.

2. The apparatus of claim 1, wherein the priority base rating is represented by a priority base value; and an application priority rating is represented by an application priority value.

3. The apparatus of claim 1, wherein the priority value is limited to a defined range of priority values.

4. The apparatus of claim 3, wherein the priority base rating defines a lower boundary for the range.

5. The apparatus of claim 3, further comprising a maximum value register for depositing a priority maximum value, wherein said priority maximum value defines an upper boundary of the range, said priority maximum value being delivered from the multithreading processor system or calculated subject to the priority base value.

6. The apparatus of claim 1, wherein the evaluation unit comprises an adder for obtaining the main value.

7. The apparatus of claim 5, wherein the evaluation unit comprises a minimum function for determining the first lower value as the lower value of the main value and the maximum value.

8. The apparatus of claim 7, further comprising an external limit value register for depositing the external limit value.

9. The apparatus of claim 1, wherein the evaluation unit comprises a second adder for adding the first lower value and the second lower value and obtaining the priority value.

10. The apparatus of claim 1, wherein corresponding registers and evaluation units are provided for determining a priority value for each thread, and wherein a sorter is provided that ranks the threads according to their respective priority value.

11. The apparatus of claim 2 wherein the evaluation unit comprises an adder for adding the priority base value and the application priority value and obtaining a main value, said main value being used as an interim value on which the priority value is based.

12. The apparatus of claim 1 wherein the priority value is re-calculated when at least one value involved in a specific calculation of the priority value has changed; and wherein, when a priority value is determined for each thread, the threads are ranked according to their respective priority value.

13. A non-transitory computer readable storage medium comprising computer readable program code embodied therein for enabling priority determination, the computer readable program enabling a computer to perform steps of:

receiving a priority base value from a multithreading processor system;

receiving an application priority rating from a thread's application delivered from a thread's associated application and attached to the thread itself;

receiving a main value by adding the priority base value and the application priority value;

determining a first lower value that is the lower value of the main value and the maximum value, the first lower value being made equal to a smallest number between the main and maximum value;

receiving an external priority value that represents a priority rating of the thread considering external needs;

defining an external limit value for the external priority value, wherein the external limit value is used to prevent starvation of other waiting threads;

determining a second lower value that is a lower value of the external priority value and the external limit value; and receiving the priority value for the thread as a function of the first lower value and the second lower value for execution on the multithreading processor system.

14. The computer readable storage medium of claim 13, wherein the computer readable program code further enables the computer to perform steps of:

wherein the priority value is re-calculated when at least one value involved in a specific calculation of the priority value has changed; and wherein, when a priority value is determined for each thread, the threads are ranked according to their respective priority value.

\* \* \* \* \*